United States Patent
Weist, Jr.

(10) Patent No.: US 8,029,603 B2
(45) Date of Patent: Oct. 4, 2011

(54) PRESSURE SWING ADSORPTION CYCLE FOR OZONE PRODUCTION

(75) Inventor: Edward Landis Weist, Jr., Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 267 days.

(21) Appl. No.: 12/358,414

(22) Filed: Jan. 23, 2009

(65) Prior Publication Data

US 2010/0189635 A1     Jul. 29, 2010

(51) Int. Cl.
*B01D 53/047*     (2006.01)

(52) U.S. Cl. .................... 95/96; 95/98; 95/138

(58) Field of Classification Search ............... 95/96–98, 95/104, 105, 138, 148; 96/121; 423/581; 422/186.07
See application file for complete search history.

(56) References Cited

U.S. PATENT DOCUMENTS

| | | | |
|---|---|---|---|
| 4,100,421 A * | 7/1978 | Tabata et al. ............. | 422/186.08 |
| 4,280,824 A | 7/1981 | Lassmann et al. | |
| 4,371,380 A | 2/1983 | Benkmann | |
| 4,604,279 A * | 8/1986 | Leitzke et al. ............. | 423/581 |
| 4,786,489 A | 11/1988 | Grenier et al. | |
| 4,863,497 A | 9/1989 | Grenier et al. | |
| 5,330,561 A * | 7/1994 | Kumar et al. ............. | 95/101 |
| 5,810,910 A | 9/1998 | Ludwig et al. | |
| 5,846,298 A | 12/1998 | Weist, Jr. | |
| 6,030,598 A | 2/2000 | Topham et al. | |
| 6,210,466 B1 * | 4/2001 | Whysall et al. ............. | 95/100 |
| 6,344,130 B1 * | 2/2002 | Koike et al. ............. | 205/626 |
| 6,530,976 B2 * | 3/2003 | Murai ............. | 95/138 |
| 6,916,359 B2 | 7/2005 | Jain | |

FOREIGN PATENT DOCUMENTS

| | | |
|---|---|---|
| CA | 2 186 976 C | 8/1996 |
| JP | 62-502682 A | 10/1987 |

* cited by examiner

*Primary Examiner* — Frank Lawrence, Jr.
(74) *Attorney, Agent, or Firm* — Willard Jones, II

(57) ABSTRACT

A pressure swing adsorption cycle designed to reduce the variations in ozone concentration, and produce a higher average ozone concentration, in a product gas stream throughout the cycle. The cycle includes a relatively long air sweep stage and provides for the overlapping of the air sweep stage in two adsorber vessels. Effluent from an adsorber vessel in a feed rinse stage is routed to another adsorber vessel that is in an air sweep stage.

18 Claims, 3 Drawing Sheets

PRESSURE SWING ADSORPTION CYCLE FOR OZONE PRODUCTION

BACKGROUND OF THE INVENTION

Ozone is a reactive triatomic allotrope of oxygen that has applications in chemical production, disinfection, drinking water treatment, air purification, bleaching of fabrics and wood pulp, wastewater treatment, and food processing. Most of the ozone used in these applications is produced by corona discharge systems using air or high-purity oxygen as the feed gas. Ozone also may be produced from air or oxygen by the action of ultraviolet light or by cold plasma generators.

High purity oxygen is used as the ozone generator feed gas in most large industrial applications of ozone. The conversion of oxygen into ozone in commercial corona discharge generators is typically between 4 and 13%, and in certain applications the resulting oxygen-ozone mixture is provided as product directly to the downstream user without further treatment. Because the cost of the unreacted oxygen is a major part of the ozone system operating cost, it is desirable in many situations to recover the oxygen from the oxygen-ozone mixture for recycling to the ozone generator. This can be accomplished, for example, by pressure swing adsorption (PSA) in which ozone is selectively adsorbed from the ozone generator outlet stream, and the recovered ozone-depleted oxygen is recycled to the ozone generator. The adsorbed ozone is desorbed by a sweep gas such as air or nitrogen, and the mixture of ozone and sweep gas is provided as product to the downstream user.

Ozone-oxygen PSA systems often use zeolite adsorbents for the selective adsorption of ozone from oxygen. It is known that zeolite adsorbents can promote the decomposition of ozone, and the degree of ozone decomposition can adversely affect ozone cost and increase the operating cost of the ozone-consuming process. The degree of ozone decomposition can be reduced by using a zeolite that contains pre-adsorbed components such as water, carbon dioxide, argon, or sulfur hexafluoride as described in U.S. Pat. No. 5,810,910. These components, which are non-reactive with ozone, are adsorbed on the adsorbent prior to ozone adsorption.

One problem with current adsorption cycles used in PSA systems, such as the adsorption cycle disclosed in U.S. Pat. No. 6,030,598, is large swings in the concentration of ozone in the product gas steam, which can impair the ability of the process that utilizes the product gas stream to operate at a steady state. Accordingly, there is a need for an improved adsorption cycle that provides a more consistent concentration of ozone in the product gas stream.

BRIEF SUMMARY OF THE INVENTION

In one respect, the invention comprises a method comprising: (a) providing a gas mixture via a first gas line, the gas mixture comprising a product gas and a reactant gas; (b) performing a cycle which comprises repeatedly performing the following steps in each of at least three adsorber vessels, each of the at least three adsorber vessels including an adsorbent having a greater adsorption affinity for the product gas than for the reactant gas: (i) feeding the gas mixture into the adsorber vessel and routing gas that exits the adsorber vessel to a recovery line, the recovery line being in fluid communication with the first gas line; and (ii) feeding a first purge gas through the adsorber vessel and routing gas that exits the adsorber vessel to a product gas line, the gas exiting the adsorber vessel comprising the first purge gas and the product gas; and (c) overlapping the performance of step (b)(ii) in one of the at least three adsorber vessels with the performance of step (b)(ii) in another one of the at least three adsorber vessels.

In another respect, the invention comprises A method for the production of a product gas using a system comprising at least three adsorption columns, the method comprising: (a) providing a gas mixture via a first gas line, the gas mixture comprising a product gas and a reactant gas; and (b) performing a cycle which comprises repeatedly performing the following steps in each of at least three adsorber vessels, each of the at least three adsorber vessels including an adsorbent having a greater adsorption affinity for the product gas than for the reactant gas: (i) feeding the gas mixture into the adsorber vessel and routing gas that exits the adsorber vessel to a recovery line, the recovery line being in fluid communication with the first gas line; (ii) feeding a first purge gas through the adsorber vessel and routing gas that exits the adsorber vessel to a product gas line, the gas exiting the adsorber vessel comprising the first purge gas and the product gas; and (iii) feeding the feed gas mixture through the adsorber vessel and routing gas the exits the adsorber vessel into another one of the at least three adsorber vessels that is performing step (b)(ii).

In yet another respect, the invention comprises a method comprising: (a) performing a pressure swing adsorption cycle during which ozone is adsorbed in each of at least one adsorber vessel, then desorbed from each of the at least one adsorber vessel and carried by a purge gas to a product gas line; and (b) maintaining an ozone concentration in the product gas line within a range of 10 mg/l during step (a).

DETAILED DESCRIPTION OF THE EMBODIMENTS OF THE INVENTION

The present invention comprises an improved PSA cycle, which is designed to reduce the variations in ozone concentration in a product gas stream throughout the cycle. The improved PSA cycle also provides an ozone product stream with higher average ozone concentration.

Unless otherwise stated herein, all percentages identified in the specification, drawings and claims should be understood to be on a volume basis.

In the claims, letters are used to identify claimed steps (e.g. (a), (b), (c), (b)(i), and (b)(ii)). These letters are used to aid in referring to the method steps and are not intended to indicate the order in which claimed steps are performed, unless and only to the extent that such order is specifically recited in the claims.

Figure 1:
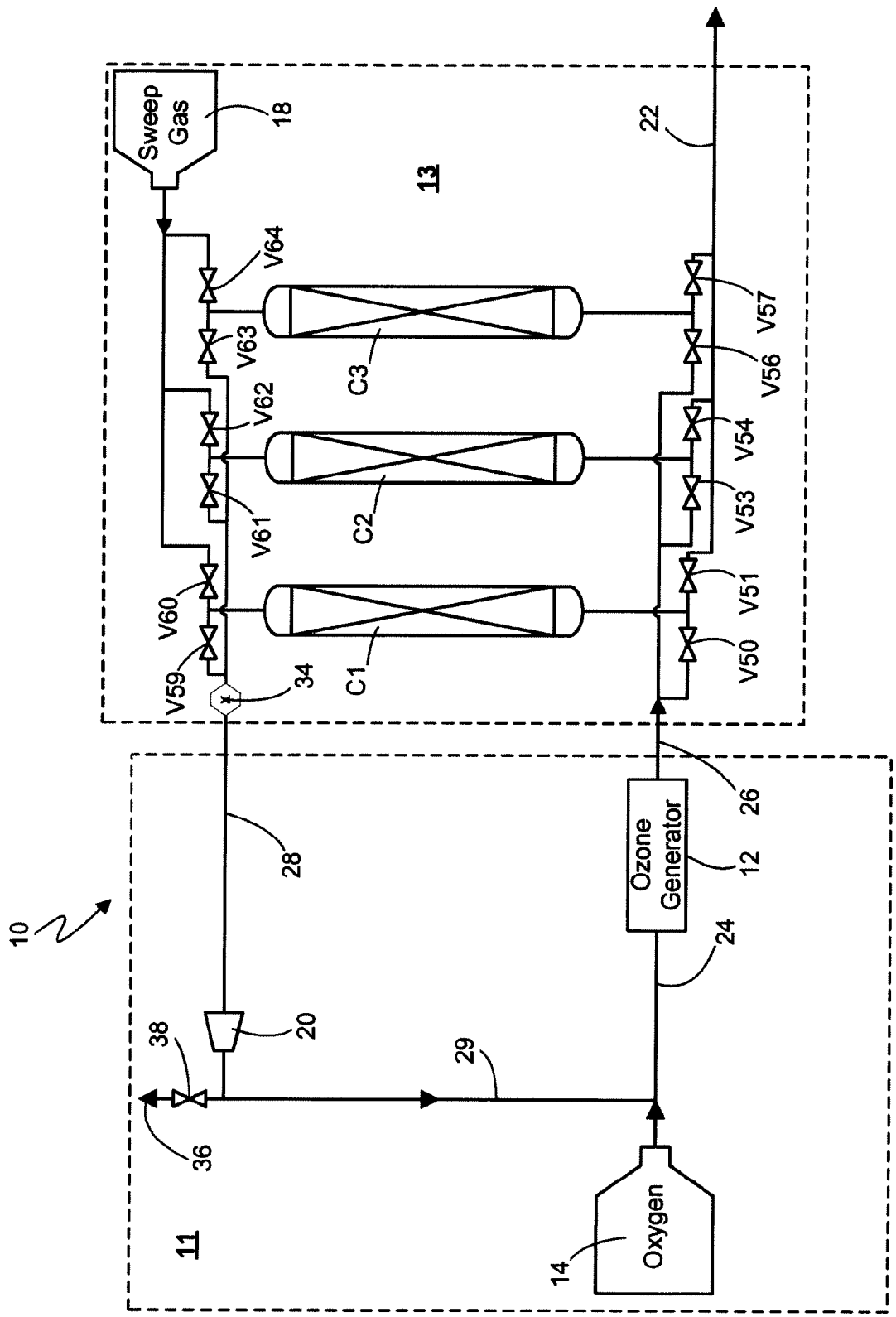
FIG. 1 is a process flow diagram of an embodiment of the present invention.

Referring to FIG. 1, a PSA ozone system 10 is shown. The system 10 comprises an ozone generating subsystem 11 which generates ozone and an adsorption subsystem 13 which separates ozone from the effluent of the ozone generating process, temporarily stores the ozone, then transports the ozone for use in an industrial process via a product gas line 22.

The ozone generating subsystem 11 generates ozone by introducing a feed gas mixture into an ozone generator 12 via a feed gas line 24. In this embodiment, the ozone generator 12 is a dielectric discharge (cold plasma) ozone generator. The feed gas mixture in feed gas line 24 preferably consists essentially of oxygen. The feed gas line 24 is connected to an oxygen supply 14, which provides air comprising at least 90% oxygen and, more preferably, at least 99% oxygen. The feed gas mixture also includes recycled gas from a recycle line 29. An oxygen concentration of at least 90%, and more preferably at least 95%, is preferably maintained in the feed gas mixture. The typical composition of the recycled gas will be described in greater detail herein. The generator effluent from the ozone generator 12, which flows through line 26, consists essentially of oxygen and ozone. A typical dielectric discharge ozone generator converts about 4-13% of the oxygen in the feed gas into ozone.

In this embodiment, oxygen is supplied via liquified gas tanks. Alternatively, any suitable means of providing reliable supplies of oxygen could be used. An oxygen supply is preferred to ambient air because ambient air contains a lower percentage of oxygen and contains a significant amount of nitrogen. Any suitable means, such as a controller and adjustable valves (not shown), could be used to control flow from the oxygen supply 14 and recovery line 28 to achieve the desired feed gas mixture composition.

As will be described in greater detail herein, the recovery line 28 is provided to enable the recovery of oxygen, and therefore, reduce the amount of make-up oxygen required to sustain the ozone generating process. The recovery line 28 preferably includes a compressor 20, which compensates for pressure drops across the system 10 and maintains a desired pressure in the recycle line 29, and therefore, in the feed gas line 24.

In this embodiment, the feed gas mixture preferably contains no more than 10% nitrogen as it enters the ozone generator 12 (i.e., in the feed gas line 24). In order to monitor nitrogen levels, the recovery line 28 preferably includes a nitrogen sensor 34. The recovery line 28 also optionally includes a vent line 36 having a valve 38, which can be used to vent gas from the recovery line 28 if the nitrogen concentration in the recovery line 28 exceeds preferred levels. As will be described in greater detail herein, the PSA cycle is also adapted to reduce the amount of nitrogen being introduced into the recovery line 28.

In this embodiment, the adsorption subsystem 13 includes three adsorber vessels C1-C3, each of which contains a similar bed of adsorbent. The adsorbent is preferably adapted to have a greater adsorbing affinity for ozone than for oxygen or nitrogen. Zeolite adsorbents are commonly used. The zeolite adsorbent in this embodiment is preferably selected from the group consisting of chabazite, erionite, mordenite, offretite, ZSM-5, HZSM-5, ZSM-11, ZSM-12, L-zeolite, ferrierite, beta zeolite, Y-type zeolite, and combinations thereof.

A supply of sweep gas 18 is provided. As will be described in greater detail herein, the sweep gas is used to desorb ozone from the adsorber vessels C1-C3 and carry the ozone to the industrial process in which is it ultimately used. The sweep gas is preferably ambient air, which has been compressed and dried to a dew point of no greater than −70 degrees F. (−57 degrees C.) and, more preferably, to a dew point of no greater than −100 degrees F. (−73 degrees C.). A plurality of valves V50 through V64 and gas lines are provided and are used to control the flow of gas through each of the adsorber vessels C1-C3 and to direct the effluent from each of the adsorber vessels C1-C3 as desired in each of the process steps described herein.

The following paragraphs describe the four preferred stages of a PSA cycle for each adsorber vessel C1-C3 in their preferred order. During operation of the system 10, each vessel C1-C3 preferably continuously repeats these stages in their preferred order. In the interest of brevity, each stage is described in relation to adsorber vessel C1, using its associated valves V50-V51 and V59-V60. It should be understood that each stage is performed in a similar manner on adsorber vessels C2, C3, using corresponding valves for each respective adsorber vessel. For example, valves V50 and V59 are open when an ozone feed stage is being conducted in adsorber vessel C1. When the ozone feed stage is being performed in adsorber vessel C2, valves V53 and V61 are open. It should also be understood that, in the description that follows, the valves that are open during a particular stage in an adsorber vessel are specifically noted. It can be assumed that all other valves associated with that adsorber vessel are closed during the stage being described. Opening and closing of the valves can be accomplished by any suitable means, such as a controller (not shown).

Ozone Feed

The purpose of an ozone feed stage is to allow the generator effluent in line 26 to flow into an adsorber vessel and allow the ozone to be adsorbed. The ozone feed stage is conducted in adsorber vessel C1 by opening valve V50, which enables the generator effluent in line 26 (consisting essentially of oxygen and ozone) to flow into the adsorber vessel C1. As the generator effluent flows through the adsorber vessel C1, ozone is adsorbed onto the adsorbent. Non-adsorbed components of the generator effluent (primarily oxygen in this embodiment) are preferably recovered by opening valve V59 and allowing the effluent from adsorber vessel C1 to flow into recovery line 28.

Product Rinse

The purpose of a product rinse stage is to reclaim the oxygen remaining in an adsorber vessel following an ozone feed stage and before an air sweep stage is performed on that adsorber vessel. This is accomplished by feeding a purge gas through the adsorber vessel while directing the effluent from the adsorber vessel into the recovery line 28. In this embodiment, the product rinse stage is performed on adsorber vessel C1 by using some of the effluent from another adsorber vessel that is in an air sweep stage (in this case, adsorber vessel C3) as the purge gas. During an air sweep stage in adsorber vessel C3, valves V64 and V57 are open. In order to initiate the product rinse stage in adsorber vessel C1, valves V51 and V59 are opened.

Preferably, the product rinse stage should be performed until nitrogen from the purge gas begins to "break through" the upper portion of the adsorber vessel C1, and halted just before substantial amounts of nitrogen enter the recovery line 28 (as detected by the nitrogen sensor 34). The level of nitrogen allowed to enter the recovery line 28 during this stage may be controlled by proper adjustment of the length of this stage or by proper control of the flow of the purge gas entering the adsorber vessel C1, or by proper control of the gas exiting the adsorber vessel C1 and entering the recovery line 28. Alternatively, the sweep gas 18 can be used as the purge gas in this step (valves and piping not shown).

Air Sweep

The purpose of an air sweep stage is to desorb ozone that has been adsorbed during an ozone feed stage and carry ozone-enriched product gas to the product gas line 22, which carries the product gas to the industrial process in which the ozone is ultimately used. In adsorber vessel C1, the air sweep stage is conducted by opening valves V60 and V51, which causes the sweep gas (acting as the purge gas in this stage) to flow through the adsorber vessel C1 and out through the product gas line 22. In this embodiment, the length of the air sweep stage in each adsorber vessel C1-C3 and is selected to provide achieve a desired overall PSA cycle length, which is discussed in greater detail below.

Feed Rinse

The purpose of a feed rinse stage is to clear the sweep gas from an adsorber vessel after the air sweep stage so that the sweep gas (which contains significant amounts of nitrogen) is not drawn into the recovery line 28 during the ozone feed stage. In this embodiment, an oxygen rinse stage is performed on adsorber vessel C1 by opening valve V50, which enables oxygen to flow into the adsorber vessel C1 via the feed gas line 26. The effluent (exiting gas) from the adsorber vessel C1 is preferably routed to another adsorber vessel that is in the air sweep stage. In this embodiment, effluent from the adsorber vessel C1 is routed to adsorber vessel C3 (which is in the air sweep stage) by opening valve V60.

Preferably, the feed rinse stage is continued until nitrogen has been nearly completely removed from the adsorber vessel C1. If a feed rinse stage is too short, an undesirably high concentration of nitrogen will be detected by the nitrogen sensor 34 in the recovery line 28 when the ozone feed stage is subsequently initiated and effluent flow is switched to the recovery line 28. The level of nitrogen allowed to enter the recovery line 28 due to residual nitrogen left in the adsorber vessel C1 prior to direction of the effluent to the recovery line 28 may be controlled by proper adjustment of the length of this stage.

Optionally, all or a portion of the effluent from an adsorber vessel on which the feed rinse stage is being performed may be combined with the sweep gas to aid in the ozone recovery in a column that is in the air sweep stage. Alternatively, though less preferred, the effluent could be directed to a vent (valve and piping not shown) or directed to the product gas line 22 (valve and piping configurations not shown).

Figure 2:
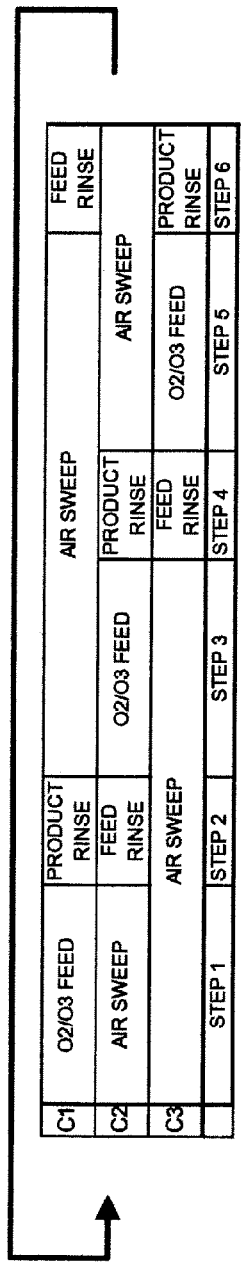
FIG. 2 is a chart showing a system cycle for the PSA ozone system shown in FIG. 1.

Referring to FIG. 2, the adsorption cycles of the three adsorber vessels C1-C3 are offset from one another in a manner that enables relatively steady-state operation of the ozone generator 12 and reduces fluctuations in ozone concentration in the product gas. The PSA cycle consists of six steps, which are set forth in FIG. 2. During each sequential step, at least one of the adsorber vessels C1-C3 switches to the next sequential stage in its portion of the PSA cycle. In order to stabilize ozone concentrations in the product gas, it is desirable that at least one of the adsorber vessels C1-C3 be in the air sweep stage during each step of the PSA cycle.

The overall PSA cycle time for each of the adsorber vessels C1-C3 is preferably selected to strike a balance between ozone concentration in the product gas line 22, consistency of ozone concentration in the product gas line 22, and oxygen savings. In relative terms, a longer adsorption cycle time will result in a greater recovery of oxygen for recycle, but at the expense of lower ozone concentration in the product gas line 22. Conversely, a short adsorption cycle time will result in lower oxygen recovery, but will result in a higher ozone concentration in the product gas.

In this embodiment, the air sweep stage of each adsorber vessel spans three steps in the PSA cycle. During the first step of the air sweep stage for one adsorber vessel, another adsorber vessel is performing the last step of its air sweep stage and the remaining adsorber vessel is performing the ozone feed stage. For example, in step 3, adsorber vessel C1 is performing the first step of its air sweep stage, adsorber vessel C3 is finishing the last step of its air sweep stage and adsorber vessel C2 is performing its ozone feed stage. During the second step of the air sweep stage for one adsorber vessel, the adsorber vessel that has just finished its air sweep stage performs its feed rinse stage and the adsorber vessel that just finished its ozone feed stage performs its product rinse stage. For example, in step 4, adsorber vessel C1 is performing the second step of its air sweep stage, adsorber vessel C3 is performing its feed rinse stage and adsorber vessel C2 is performing its product rinse stage.

During the periods of time in which the air sweep stages of two adsorber vessels overlap (i.e., during the first and third steps of each air sweep stage), all of the gas exiting the two adsorber vessels performing air sweep stages is preferably directed to the product gas line 22. In addition, it is preferable that the flow rate of sweep gas from the sweep gas supply 18 be regulated to reduce variations in ozone concentration in the product gas line 22.

As noted above, during the period of time in which the air sweep stage of an adsorber vessel overlaps with the product rinse stage in another adsorber vessel, the effluent from the adsorber vessel performing the air sweep stage is preferably split between the product gas line 22 and providing the feed gas for the adsorber vessel that is performing the product rinse stage. Preferably, the system 10 includes means for controlling how much of the effluent gas flows to product gas line 22 and how much flows into the adsorber vessel that is performing the product rinse stage. In this embodiment, this could be accomplished by regulating the pressure in the adsorber vessel that is performing the product rinse stage using the compressor 20. Alternatively, proportional valves (not shown) could be used.

The air sweep stage is preferably performed in each adsorber vessel for a period of time that is longer than the performance of any of the other stages in that adsorber vessel. More preferably, the air sweep stage is preferably at least twice as long as any of the other stages. In addition, the ozone feed stage is preferably performed for a period of time that is longer than the performance of each of the product rinse stage and the feed rinse stage. More preferably, the ozone feed stage is at least twice as long as each of the product rinse stage and the feed rinse stage. The length of each stage is also preferably equal across all of the adsorber vessels (e.g., the air sweep stage is performed for the same period of time in each of the adsorber vessels C1-C3).

Figure 3:
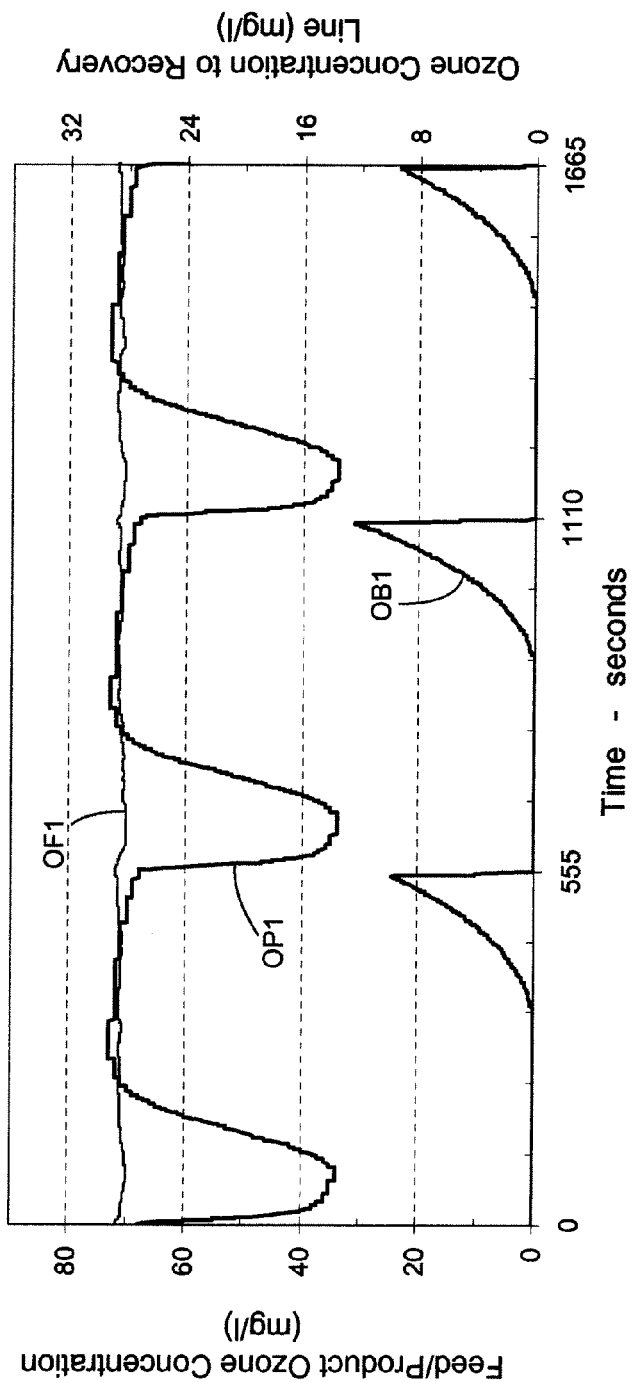
FIG. 3 is a graph showing data from a test performed using a prior art adsorption cycle.
Figure 4:
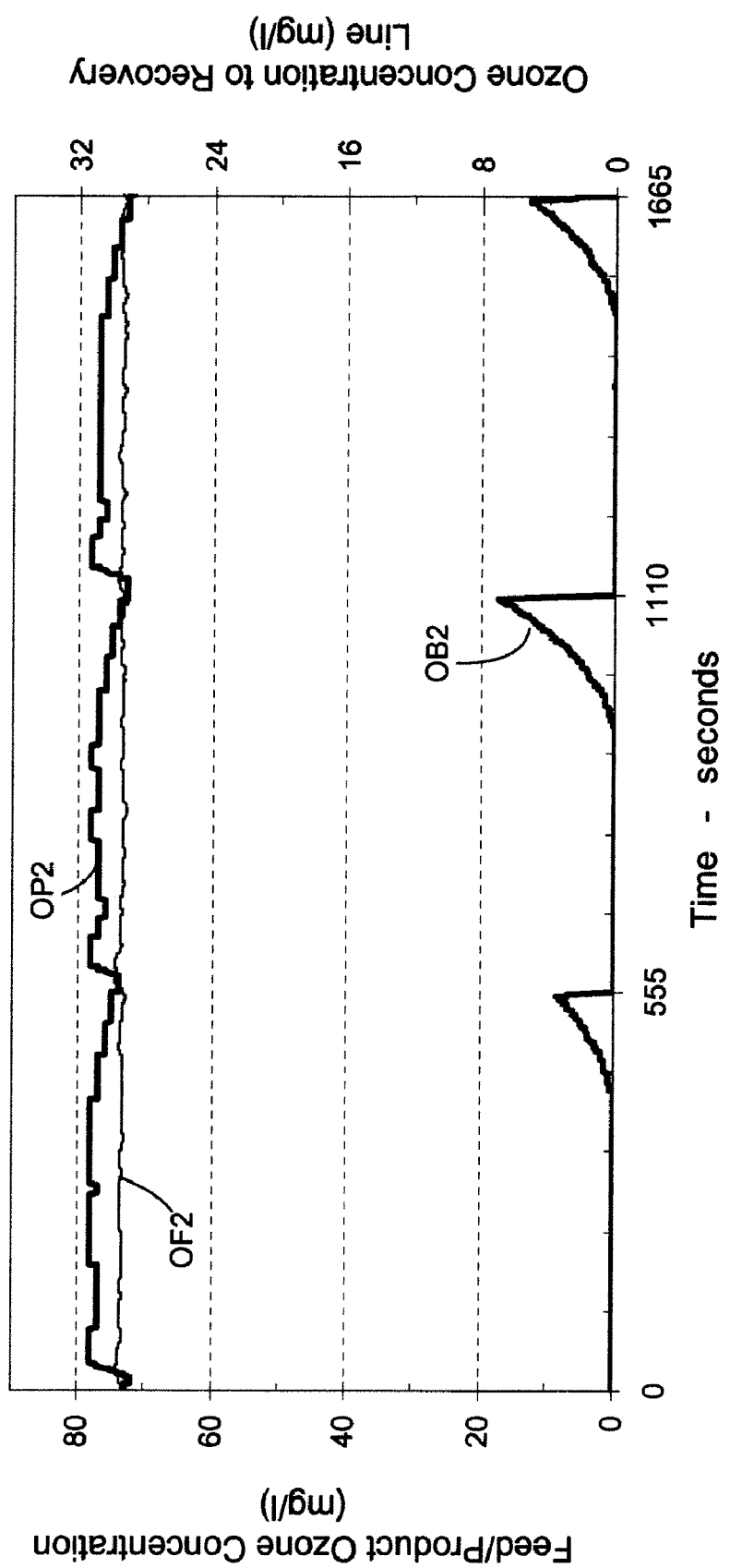
FIG. 4 is a graph showing data from a test performed using the adsorption cycle of the present invention.

FIGS. 3 and 4 show data from test performed using the PSA cycle disclosed in U.S. Pat. No. 6,030,589 and the present invention, respectively. In both tests, three adsorber vessels were used, each being about 5 cm in diameter and 160 cm tall. The adsorbent in each column consisted of 2700 grams of silica-bound HZSM-5 in the form of 1.5 mm diameter extrudates. Adsorption was performed at about 15 degrees C. and 1.1 barg. The ozone concentration in the line 26 was maintained at about 72 mg/l.

Referring to FIG. 3, for the test run using the PSA cycle of U.S. Pat. No. 6,030,589, the ozone concentration in the gas being fed into the adsorber vessels is shown by line OF1, the ozone concentration in the product gas line is shown by line OP1 and the ozone concentration ("breakthrough") in the recovery line is shown by line OB1. Similarly, referring to FIG. 4, for the test run using the PSA cycle of the present invention, the ozone concentration in the gas being fed into the adsorber vessels is shown by line OF2, the ozone concentration in the product gas line is shown by line OP2 and the ozone concentration ("breakthrough") in the recovery line is shown by line OB2. In these tests, the PSA cycle of the present invention produced significantly improved ozone product characteristics, including much smaller swings in ozone concentration in the product gas stream (a variation of about 6 mg/l vs. swings of 39 mg/l for the PSA cycle of U.S.

Pat. No. 6,030,589) and a higher average ozone concentration in the product gas line (about 77 mg/l vs. about 62 mg/l for the PSA cycle of U.S. Pat. No. 6,030,589).

The PSA cycle of the present invention could be adapted to maintain ozone concentration in the product gas line 22 within a range that is acceptable for the process in which the ozone is ultimately used. For example, in some processes, a variation in ozone concentration of 10 mg/l or more would be acceptable, but in other applications a a variation in ozone concentration of 5 mg/l, 3 mg/l or less would be preferred.

In alternate embodiments, the ozone generating subsystem 11 could be used with other types of adsorption subsystems, such as a vacuum-swing adsorption system, for example. Finally, the adsorption subsystem 13 could include any number of adsorber vessels.

In addition, the feed gas mixture could include one or more additives, such as nitrogen, helium, or another noble gas, to enhance ozone generation and/or improve another part of the ozone generating process. As explained in U.S. Patent Application Publication No. 2010/0187092, which is incorporated herein as if fully set forth, helium is a preferred additive to the feed gas mixture because it does not have the corrosive side effects associated with nitrogen dioxide, a by-product of corona discharge ozone generators when nitrogen in present in the feed gas. Due to the relatively high unit cost of helium, it is preferable to modify the PSA cycle set forth in this application to reduce helium losses. Such cycle modifications and preferred additional components to accommodate the addition of helium to the feed gas mixture are set forth in U.S. Patent Application Publication No. 2010/0187092.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method comprising:
   (a) providing a gas mixture via a first gas line, the gas mixture comprising a product gas and a reactant gas;
   (b) performing a cycle which comprises repeatedly performing the following steps in each of at least three adsorber vessels, each of the at least three adsorber vessels including an adsorbent having a greater adsorption affinity for the product gas than for the reactant gas:
      (i) feeding the gas mixture from the first gas line into the adsorber vessel and routing gas that exits the adsorber vessel to a recovery line, the recovery line being in fluid communication with the first gas line;
      (ii) feeding a first purge gas through the adsorber vessel and routing gas that exits the adsorber vessel to a product gas line, the gas exiting the adsorber vessel comprising the first purge gas and the product gas; and
      (iii) feeding the feed gas mixture through the adsorber vessel and routing gas that exits the adsorber vessel into another one of the at least three adsorber vessels that is performing step (b)(ii); and
   (c) overlapping the performance of step (b)(ii) in one of the at least three adsorber vessels with the performance of step (b)(ii) in another one of the at least three adsorber vessels.

2. The method of claim 1, wherein step (b) further comprises directing all gas that exits the adsorber vessels performing step (b)(ii) to the product gas line during the performance of step (c).

3. The method of claim 2, wherein step (b) further comprises performing step (b)(i) in another one of the at least three adsorber vessels during performance of step (c).

4. The method of claim 1, wherein step (b) further comprises:
   (iv) feeding a second purge gas through the adsorber vessel and routing gas that exits the adsorber vessel to the recovery line.

5. The method of claim 1, wherein step (b) further comprises:
   (iv) feeding a second purge gas through the adsorber vessel and routing gas that exits the adsorber vessel to the recovery line, the second purge gas consisting of a portion of the gas exiting one of the at least three adsorber vessels that is performing step (b)(ii).

6. The method of claim 4, wherein step (b) further comprises performing steps (b)(i) through (b)(iv) in the following sequence in each of the at least three adsorber vessels: step (b)(i), (b)(iv), (b)(ii), then (b)(iii).

7. The method of claim 4, wherein step (b) further comprises performing step (b)(iv) in one of the at least three adsorber vessels while another one of the at least three adsorber vessels is performing step (b)(iii).

8. The method of claim 7, wherein step (b) further comprises beginning and ending step (b)(iv) in one of the at least three adsorber vessels concurrently with beginning and ending of step (b)(iii) in another one of the at least three adsorber vessels.

9. The method of claim 4, wherein step (b) further comprises performing step (b)(ii) for a period of time that is longer than each of steps (b)(i), (b)(iii) and (b)(iv) is performed.

10. The method of claim 1, wherein step (a) comprises providing a gas mixture via a first gas line, the gas mixture comprising a product gas and a reactant gas, the product gas being ozone.

11. The method of claim 1, wherein step (a) comprises providing a gas mixture via a first gas line, the gas mixture comprising a product gas and a reactant gas, the reactant gas being oxygen.

12. The method of claim 1, wherein step (b)(ii) comprises feeding a first purge gas through the adsorber vessel and routing gas that exits the adsorber vessel to a product gas line, the first purge gas consisting of ambient air having a dew point no greater than −57 degrees C.

13. The method of claim 1, wherein step (b) further comprises performing step (b)(ii) for a period of time that is longer than step (b)(i) is performed.

14. The method of claim 1, wherein step (b) further comprise performing a cycle which comprises repeatedly performing steps (b)(i) and (b)(ii) on each of no more than three adsorber vessels.

15. A method for the production of a product gas using a system comprising at least three adsorption columns, the method comprising:
   (a) providing a gas mixture via a first gas line, the gas mixture comprising a product gas and a reactant gas; and
   (b) performing a cycle which comprises repeatedly performing the following steps in each of at least three adsorber vessels, each of the at least three adsorber vessels including an adsorbent having a greater adsorption affinity for the product gas than for the reactant gas:
      (i) feeding the gas mixture from the first gas line into the adsorber vessel and routing gas that exits the adsorber vessel to a recovery line, the recovery line being in fluid communication with the first gas line;
      (ii) feeding a first purge gas through the adsorber vessel and routing gas that exits the adsorber vessel to a product gas line, the gas exiting the adsorber vessel comprising the first purge gas and the product gas; and (iii) feeding the feed gas mixture through the adsorber vessel and routing gas the exits the adsorber vessel into another one of the at least three adsorber vessels that is performing step (b)(ii).

16. The method of claim 15, wherein step (b) further comprises:

(iv) feeding a second purge gas through the adsorber vessel and routing gas that exits the adsorber vessel through the recovery line.

17. The method of claim 16, wherein step (b) further comprises performing steps (b)(i) through (b)(iv) in the following sequence in each of the at least three adsorber vessels: step (b)(i), (b)(iv), (b)(ii), then (b)(iii).

18. A method comprising:

(a) providing a gas mixture via a first gas line, the gas mixture comprising a product gas and a reactant gas;

(b) performing a cycle which comprises repeatedly performing the following steps in each of at least three adsorber vessels in the order set forth below, each of the at least three adsorber vessels including an adsorbent having a greater adsorption affinity for the product gas than for the reactant gas:

(i) feeding the gas mixture into the adsorber vessel and routing gas that exits the adsorber vessel to a recovery line, the recovery line being in fluid communication with the first gas line; and (ii) feeding a first purge gas through the adsorber vessel and routing gas that exits the adsorber vessel to a product gas line, the gas exiting the adsorber vessel comprising the first purge gas and the product gas;

(iii) feeding the feed gas mixture through the adsorber vessel and routing gas that exits the adsorber vessel into another one of the at least three adsorber vessels that is performing step (b)(ii);

(iv) feeding a second purge gas through the adsorber vessel and routing gas that exits the adsorber vessel to the recovery line, the second purge gas consisting of a portion of the gas exiting one of the at least three adsorber vessels that is performing step (b)(ii); and (c) overlapping the performance of step (b)(ii) in one of the at least three adsorber vessels with the performance of step (b)(ii) in another one of the at least three adsorber vessels.

* * * * *